(12) United States Patent
Sparks et al.

(10) Patent No.: US 10,035,948 B2
(45) Date of Patent: Jul. 31, 2018

(54) COMPOSITION INCLUDING A VISCOSIFIER AND A HYDROPHOBICALLY-MODIFIED POLYMER THAT INCLUDES A NITROGEN-CONTAINING REPEATING UNIT FOR TREATMENT OF SUBTERRANEAN FORMATIONS

(71) Applicant: Halliburton Energy Services, Inc., Houston, TX (US)

(72) Inventors: Bradley J. Sparks, Richmond, TX (US); Loan K. Vo, Houston, TX (US); Jimmie Dean Weaver, Jr., Duncan, OK (US); Christopher Parton, Humble, TX (US); Jessica L. Heeter, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/517,501

(22) PCT Filed: Nov. 6, 2014

(86) PCT No.: PCT/US2014/064343
§ 371 (c)(1),
(2) Date: Apr. 6, 2017

(87) PCT Pub. No.: WO2016/072993
PCT Pub. Date: May 12, 2016

(65) Prior Publication Data
US 2017/0253790 A1 Sep. 7, 2017

(51) Int. Cl.
*C09K 8/68* (2006.01)
*C09K 8/52* (2006.01)
(Continued)

(52) U.S. Cl.
CPC .......... *C09K 8/68* (2013.01); *C09K 8/52* (2013.01); *C09K 8/725* (2013.01); *C09K 8/80* (2013.01);
(Continued)

(58) Field of Classification Search
CPC ... C09K 8/68; C09K 8/52; C09K 8/72; C09K 8/725; C09K 8/80; C09K 8/90;
(Continued)

(56) References Cited

U.S. PATENT DOCUMENTS 4,460,751 A * 7/1984 Hanlon .............. C09K 3/00
166/270
4,797,216 A * 1/1989 Hodge .............. C09K 8/685
166/308.5
(Continued)

FOREIGN PATENT DOCUMENTS

WO 2013059082 4/2013
WO 2014109939 7/2014
(Continued)

OTHER PUBLICATIONS

International Search Report and Written Opinion of PCT Application No. PCT/US2014/064343 dated Jul. 22, 2015: pp. 1-14.
(Continued)

*Primary Examiner* — Zakiya W Bates
*Assistant Examiner* — Crystal J Miller
(74) *Attorney, Agent, or Firm* — Chamberlain Hrdlicka

(57) ABSTRACT

Various embodiments disclosed related to compositions and methods of using the same for treating subterranean formations. In various embodiments, the present invention provides a method of treating a subterranean formation. The method includes placing in a subterranean formation a composition that includes a viscosifier and that also includes
(Continued)

a hydrophobically-modified polymer including at least one nitrogen-containing repeating unit.

20 Claims, 4 Drawing Sheets

(51) Int. Cl.
| | | |
|---|---|---|
| *E21B 43/26* | (2006.01) | |
| *C09K 8/80* | (2006.01) | |
| *C09K 8/90* | (2006.01) | |
| *C09K 8/72* | (2006.01) | |
| *E21B 43/267* | (2006.01) | |
| *E21B 43/25* | (2006.01) | |
| *E21B 43/11* | (2006.01) | |
| *E21B 37/00* | (2006.01) | |

(52) U.S. Cl.
CPC .............. *C09K 8/90* (2013.01); *E21B 37/00* (2013.01); *E21B 43/11* (2013.01); *E21B 43/25* (2013.01); *E21B 43/26* (2013.01); *E21B 43/267* (2013.01); *C09K 2208/24* (2013.01); *C09K 2208/26* (2013.01)

(58) Field of Classification Search
CPC .......... E21B 37/00; E21B 43/11; E21B 43/25; E21B 43/26; E21B 43/267
See application file for complete search history.

(56) References Cited

U.S. PATENT DOCUMENTS

| | | | | |
|---|---|---|---|---|
| 6,476,169 | B1* | 11/2002 | Eoff | C09K 8/5083 526/259 |
| 7,040,403 | B2 | 5/2006 | Nguyen et al. | |
| 7,114,568 | B2 | 10/2006 | Eoff et al. | |
| 7,563,750 | B2* | 7/2009 | Eoff | C09K 8/5083 166/305.1 |
| 7,690,431 | B2 | 4/2010 | Nguyen et al. | |
| 7,759,292 | B2* | 7/2010 | Eoff | C09K 8/035 166/305.1 |
| 8,082,992 | B2* | 12/2011 | Todd | C09K 8/506 166/250.1 |
| 8,114,818 | B2* | 2/2012 | Reddy | C09K 8/035 507/203 |
| 8,813,843 | B2* | 8/2014 | Braganza | C09K 8/685 166/279 |
| 8,877,691 | B2* | 11/2014 | Reddy | C09K 8/035 166/305.1 |
| 9,018,140 | B2* | 4/2015 | Weaver | C09K 8/12 166/305.1 |
| 2004/0209780 | A1* | 10/2004 | Harris | C09K 8/602 507/117 |
| 2004/0229756 | A1* | 11/2004 | Eoff | C09K 8/10 507/219 |
| 2006/0124309 | A1 | 6/2006 | Nguyen et al. | |
| 2008/0234147 | A1* | 9/2008 | Li | C09K 8/512 507/215 |
| 2009/0095535 | A1 | 4/2009 | Nguyen | |
| 2009/0145607 | A1* | 6/2009 | Li | C09K 8/685 166/308.5 |
| 2009/0181866 | A1* | 7/2009 | Reddy | C09K 8/035 507/211 |
| 2009/0203555 | A1* | 8/2009 | Milne | C09K 8/508 507/222 |
| 2011/0005753 | A1* | 1/2011 | Todd | C09K 8/506 166/282 |
| 2011/0256085 | A1* | 10/2011 | Talingting Pabalan | A61K 8/042 424/70.13 |
| 2012/0004148 | A1* | 1/2012 | Ogle | C09K 8/12 507/213 |
| 2012/0111564 | A1* | 5/2012 | Reddy | C09K 8/035 166/279 |
| 2013/0098618 | A1* | 4/2013 | Braganza | C09K 8/685 166/305.1 |
| 2013/0310284 | A1* | 11/2013 | Weaver | C09K 8/12 507/121 |

FOREIGN PATENT DOCUMENTS

| | | |
|---|---|---|
| WO | 2014110110 | 7/2014 |
| WO | 2015020666 | 2/2015 |
| WO | 2015020688 | 2/2015 |
| WO | 2015105521 | 7/2015 |

OTHER PUBLICATIONS

Welton et al., SPE 105815: "Anionic Surfactant Gel Treatment Fluid," SPE International, 2007: pp. 1-8.

* cited by examiner

COMPOSITION INCLUDING A VISCOSIFIER AND A HYDROPHOBICALLY-MODIFIED POLYMER THAT INCLUDES A NITROGEN-CONTAINING REPEATING UNIT FOR TREATMENT OF SUBTERRANEAN FORMATIONS

BACKGROUND

During hydraulic fracturing, the use of compositions having high viscosities in subterranean formations is important for a wide variety of purposes. Higher viscosity fluids can more effectively carry materials to a desired location in a subterranean formation, such as proppants. The use of higher viscosity fluids generally results in larger more dominant fractures. One common way to attain high viscosities in hydraulic fracturing fluids is to use a mixture of water and a viscosifier, such as guar gum. However, typically viscosifiers must be added in high concentrations to provide viscosities sufficient to suspend a desired proppant, which can result in high transportation costs and low efficiency preparation of viscous materials. However, pumping high viscosity materials into a subterranean formation can require a large amount of energy. Also, the higher temperatures experienced in a subterranean formation can limit, reduce, or degrade the effectiveness of certain viscosifiers, resulting in the use of larger amounts of viscosifiers to compensate for the high temperatures, or the use of expensive temperature-resistant viscosifiers. In addition, the presence of certain ions in water can limit, reduce, or degrade the effectiveness of certain viscosifiers. This limits the use of certain ion-containing water, such as sea water, or water recovered from or naturally produced by some subterranean formations. As a result, the oil and gas industry spends substantial amounts of money and energy to use large amounts of viscosifiers to compensate for salt sensitivity, obtain expensive salt-resistant viscosifiers, obtain fresh water used for fracturing fluid applications, or to avoid formations having substantial concentrations of particular ions.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
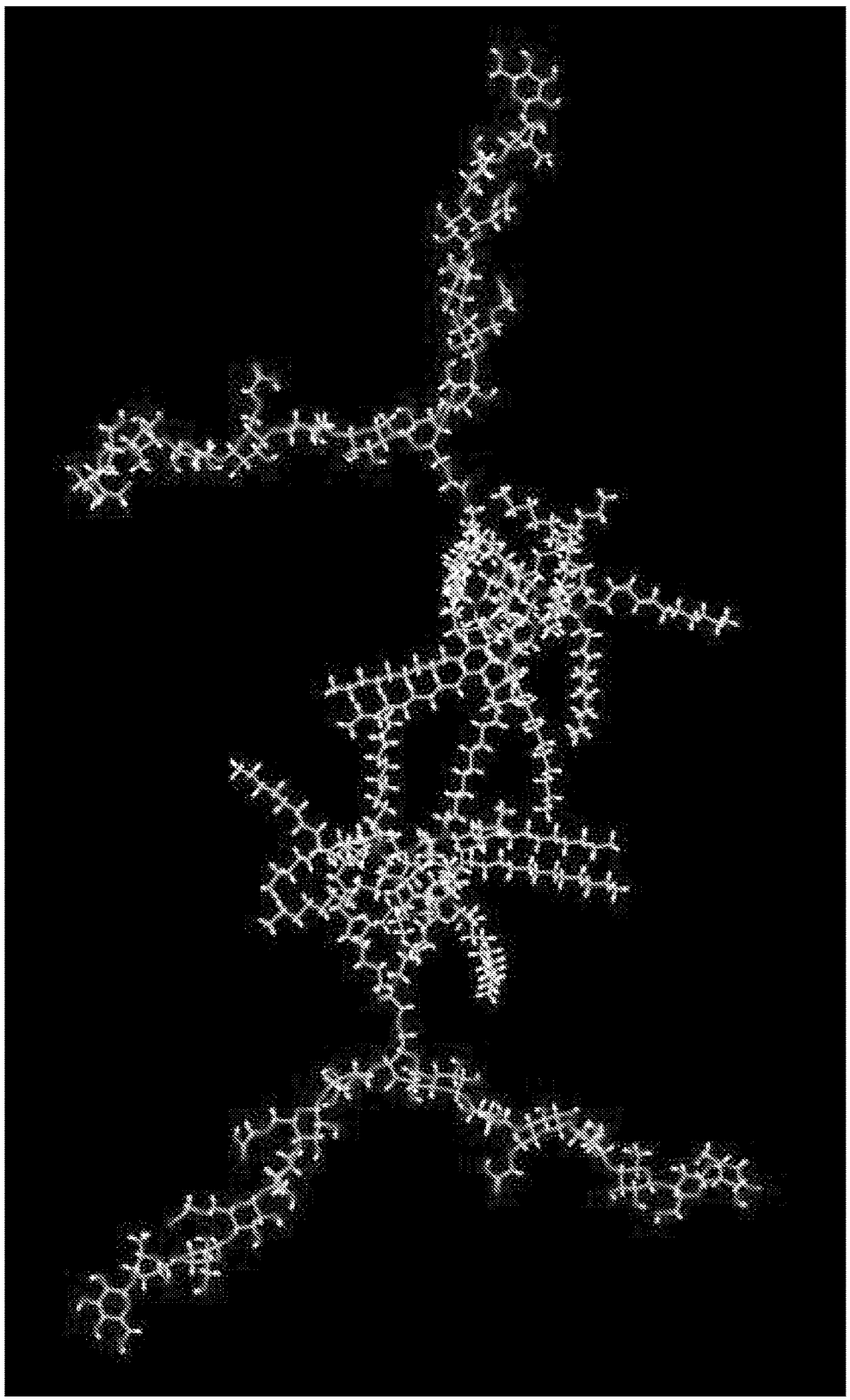
FIG. 1 illustrates a molecular model showing hydrophobic association between cellulose polymer chains and polyethyleneimine, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods of manufacturing described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750, 000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-,3-, 4-, 5-, or 6-substituted phenyl or 2-8 substituted naphthyl groups, which can be substituted with carbon or non-carbon groups such as those listed herein.

The term "heterocyclyl" as used herein refers to aromatic and non-aromatic ring compounds containing three or more ring members, of which one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula $N(group)_3$ wherein each group can independently be H or non-H, such as alkyl, aryl, and the like. Amines include but are not limited to $R-NH_2$, for example, alkylamines, arylamines, alkylarylamines; $R_2NH$ wherein each R is independently selected, such as dialkylamines, diarylamines, aralkylamines, heterocyclylamines and the like; and $R_3N$ wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form $-NH_2$, $-NHR$, $-NR_2$, $-NR_3^+$, wherein each R is independently selected, and protonated forms of each, except for $-NR_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Non-limiting examples of solvents are silicones, organic compounds, water, alcohols, ionic liquids, and supercritical fluids.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, "gpt" refers to gallons per thousand gallons.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The polymers described herein can terminate in any suitable way. In some embodiments, the polymers can terminate with an end group that is independently chosen from a suitable polymerization initiator, —H, —OH, a substituted or unsubstituted ($C_1$-$C_{20}$)hydrocarbyl (e.g., ($C_1$-$C_{10}$)alkyl or ($C_6$-$C_{20}$)aryl) interrupted with 0, 1, 2, or 3 groups independently selected from —O—, substituted or unsubstituted —NH—, and —S—, a poly(substituted or unsubstituted ($C_1$-$C_{20}$)hydrocarbyloxy), and a poly(substituted or unsubstituted ($C_1$-$C_{20}$)hydrocarbylamino).

In various embodiments, the present invention provides a method of treating a subterranean formation. The method includes placing in a subterranean formation a composition including a viscosifier. The composition also includes a hydrophobically-modified polymer including at least one nitrogen-containing repeating unit.

In various embodiments, the present invention provides a method of treating a subterranean formation. The method includes placing in a subterranean formation a composition including a viscosifier including at least one of cellulose, cellulose derivative, guar gum, and guar gum derivative. The composition also includes a hydrophobically-modified polyethyleneimine. About 20 mol % to about 80 mol % of nitrogen atoms in the polyethyleneimine include the hydrophobic modification. The hydrophobic modification is ($C_1$-$C_{30}$)alkoxyfuryl-C(O)O—. The furan is bonded via the 2- and 5-positions.

In various embodiments, the present invention provides a method of treating a subterranean formation. The method includes placing in a subterranean formation a composition including a carboxymethyl hydroxyethyl cellulose viscosifier. The composition also includes a 5-(tetradecyloxy)-2-furoic acid-modified polyethyleneimine. About 20 mol % to about 80 mol % of nitrogen atoms in the polyethyleneimine include the 5-(tetradecyloxy)-2-furoic acid-modification.

In various embodiments, the present invention provides a system. The system includes a composition that includes a viscosifier and a hydrophobically-modified polymer including at least one nitrogen-containing repeating unit. The system also includes a subterranean formation including the composition therein.

In various embodiments, the present invention provides a composition for treatment of a subterranean formation. The composition includes a viscosifier including at least one of cellulose, a cellulose derivative, guar gum, and a guar gum derivative. The composition also includes a hydrophobically-modified polyethyleneimine. About 20 mol % to about 80 mol % of nitrogen atoms in the polyethyleneimine include the hydrophobic modification. The hydrophobic modification is ($C_1$-$C_{30}$)alkoxyfuryl-C(O)O—. The furan is bonded via the 2- and 5-positions.

In various embodiments, the present invention provides a composition for treatment of a subterranean formation. The composition includes a carboxymethyl hydroxyethyl cellulose viscosifier. The composition also includes a 5-(tetradecyloxy)-2-furoic acid-modified polyethyleneimine. About 20 mol % to about 80 mol % of nitrogen atoms in the polyethyleneimine include the 5-(tetradecyloxy)-2-furoic acid-modification.

In various embodiments, the present invention provides a method of preparing a composition for treatment of a subterranean formation. The method includes forming a composition that includes a viscosifier. The composition also includes a hydrophobically-modified polymer including at least one nitrogen-containing repeating unit.

In various embodiments, the composition and method of using the same provide advantageous over other compositions and methods, at least some of which are unexpected. For example, in various embodiments, the composition and method of using the same can provide one or more advantages over a corresponding composition that lacks the polymer including at least one hydrophobically-modified nitrogen-containing repeating unit or method of using the same. In various embodiments, the composition or method of using the same can provide increased viscosity, such as increased initial viscosity. In various embodiments, the use of a polymer including at least one hydrophobically-modified nitrogen-containing repeating unit can allow the composition or method of using the same to achieve a particular range of viscosities using less polysaccharide viscosifier. In various embodiments, the use of a polymer including at least one hydrophobically-modified nitrogen-containing repeating unit can provide an extended break time. In various embodiments, the composition can include salt water and can have a higher viscosity, such as compared to a corresponding composition including salt water but not including the polymer including at least one hydrophobically-modified nitrogen-containing repeating unit. In various embodiments, the composition can have higher viscosity under high shear.

In various embodiments, the composition or method of using the same can treat the surface of the subterranean formation or materials therein such as proppants, modifying the surface thereof to provide advantageous properties, such as compared to a corresponding composition that lacks the polymer including at least one hydrophobically-modified nitrogen-containing repeating unit or method of using the same. For example, in some embodiments, the composition or method of using the same can provide various surfaces contacted thereto with altered affinity for water or organics/oils, such as greater hydrophobic properties. In various embodiments, the combination of improved viscosity properties and improved other properties relating to surface modification can be advantageous, providing a combination of improvements that are difficult to achieve with other compositions and methods without multiple treatments and higher cost. For example, in some embodiments, the composition or method of using the same can provide better fines control, and can help to reduce the movement and production of fines. In some embodiments, the composition or method of using the same can help to avoid or reduce screen out. In some embodiments, the composition or method of using the same can provide improved fracture conductivity or improved proppant pack conductivity. In some embodiments, the composition or method of using the same can provide improved and easier clean up after breaking. In some embodiments, the composition or method of using the same can provide increased scale inhibition. In some embodiments, the composition or method of using the same can provide reduced fluid loss. In some embodiments, the composition or method of using the same can prevent or provide reduced diagenesis.

Method of Treating a Subterranean Formation.

In various embodiments, a significant and unexpected viscosity enhancement was discovered when hydrophobically modified nitrogen-containing polymers such as polyamines, polyimines, or polyamides were included in fluids formulated using viscosifiers such as carboxymethyl hydroxyethyl cellulose (CMHEC). In some embodiments, the use of hydrophobically-modified polymer can improve the initial viscosity in hydraulic fracturing fluids hydrated in seawater.

Embodiments of the present invention are not restricted to any particular chemical mechanism. In some embodiments, the hydrophobically-modified polymer can provided an additional crosslinking network to the crosslinked fluid via different intermolecular force (IMF) mechanisms. FIG. 1 illustrates a molecular model showing hydrophobic association between two cellulose polymer chains (left and right) to which has some hydrophobically-modified polyethyleneimine interacting therewith (center). This interaction can be via van der Waal interaction and can be made and broken and remade without any damage to the system. The amine-containing portion of the molecules are water soluble, acting as both hydrogen bonding acceptors and donors, and providing interaction with the viscosifier (e.g., an anionic hydrated polysaccharide). Because of the concentration of the amine functionalities, a great deal of hydrogen bonding can occur between the hydrophobically-modified polymer and the viscosifier. The hydrophobic functionality of the polymer can bring the two or more viscosifier strands together via hydrophobic interaction, hence providing additional temporary crosslinking network in the fluid. Metal crosslinked fluid, especially in seawater, suffers severely at high shear and high temperature due to the lack of rehealability of the fluid. By providing additional temporary crosslinking network to the fluid, the hydrophobically-modified polymer additive can help to solve this issue.

In various embodiments, that addition of the hydrophobically-modified polymer had no negative effect in the clean-up property of the fluid. In some embodiments, the hydrophobically-modified polymer enhanced proppant pack conductivity due, for example, to hydrophobically-modification of the proppant surface, aiding clean-up.

The incorporation of these additives can provide a benefit of conductivity enhancement in terms of fines control. After the fluid has broken, the hydrophobically-modified polymer can remain water insoluble and can bind to the formation surface, acting as a surface modification agent to control fines migration.

In some embodiments, the present invention provides a method of treating a subterranean formation. The method includes placing a composition including a viscosifier and a hydrophobically-modified polymer including at least one amine-containing repeating unit in a subterranean formation. The placing of the composition in the subterranean formation can include contacting the composition and any suitable part of the subterranean formation, or contacting the composition and a subterranean material, such as any suitable subterranean material. The subterranean formation can be any suitable subterranean formation. In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing and can include any suitable contacting between the subterranean formation and the composition. The method can include surface treating the subterranean formation with the composition, such as at least one of before, during, and after hydraulic fracturing. In some embodiments, the method includes obtaining or providing the composition including the viscosifier and the hydrophobically-modified polymer, such as mixing the viscosifier and the hydrophobically-modified polymer or by preparing the components. The obtaining or providing of the composition can occur at any suitable time and at any suitable location. The obtaining or providing of the composition can occur above the surface. The obtaining or providing of the composition can occur in the subterranean formation (e.g., downhole).

The method can include hydraulic fracturing, such as a method of hydraulic fracturing to generate a fracture or flow pathway. The placing of the composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing (e.g., the composition can be a hydraulic fracturing fluid), such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter, such as during a first pad stage), or a slurry stage of the fracturing (e.g., viscous fluid with proppant). The method can include performing a stimulation treatment at least one of before, during, and after placing the composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the composition is placed or contacted, or the composition is placed or contacted to an area surrounding the generated fracture or flow pathway.

In some embodiments, the method can be a method of stimulation, fracturing, spotting, clean-up, completion, remedial treatment, applying a pill, acidizing, packing, spotting, or a combination thereof.

The method can include breaking the composition. Breaking the composition can include subjecting the composition to suitable conditions downhole for a sufficient period of time. The composition can include one or more breakers to facilitate the breaking, as described herein.

The composition can include water. Any suitable proportion of the composition can be water, such as about 50 wt % to about 99.99 wt %, about 95 wt % to about 99.99 wt %. The water can be any suitable water, such as at least one of fresh water, brine, produced water, flowback water, brackish water, and sea water. The water can be salt water. The salt can be any suitable salt, such as at least one of NaBr, $CaCl_2$, $CaBr_2$, $ZnBr_2$, KCl, NaCl, a magnesium salt, a bromide salt, a formate salt, an acetate salt, and a nitrate salt. The composition including the combination of the viscosifier and the hydrophobically-modified polymer include salt water having any suitable total dissolved solids level (e.g., wherein the dissolved solids correspond to dissolved salts), such as about 1,000 mg/L to about 250,000 mg/L, or about 1,000 mg/L or less, or about 5,000 mg/L, 10,000, 15,000, 20,000, 25,000, 30,000, 40,000, 50,000, 75,000, 100,000, 125,000, 150,000, 175,000, 200,000, 225,000, or about 250,000 mg/L or more. The composition can include salt water having any suitable salt concentration, such as about 1,000 ppm to about 300,000 ppm, or about 1,000 ppm to about 150,000 ppm, or about 1,000 ppm or less, or about 5,000 ppm, 10,000, 15,000, 20,000, 25,000, 30,000, 40,000, 50,000, 75,000, 100,000, 125,000, 150,000, 175,000, 200,000, 225,000, 250, 000, 275,000, or about 300,000 ppm or more. In some examples, the water can have a concentration of at least one of NaBr, $CaCl_2$, $CaBr_2$, $ZnBr_2$, KCl, and NaCl of about 0.1% w/v to about 20% w/v, or about 0.1% w/v or less, or about 0.5% w/v, 1, 2, 3, 4, 5, 6, 7, 8, 9, 10, 11, 12, 13, 14, 15, 16, 17, 18, 19, 20, 21, 22, 23, 24, 25, 26, 27, 28, 29, or about 30% w/v or more. In various embodiments, the water can include polyions such as $Sr^{2+}$ or $Ba^{2+}$ in any suitable concentration.

Viscosifier.

The composition includes one or more viscosifiers. The viscosifier can be any suitable viscosifier. The viscosifier can affect the viscosity of the composition. In some embodiments, the viscosifier provides an increased viscosity at least one of before injection into the subterranean formation, at the time of injection into the subterranean formation, during travel through a tubular disposed in a borehole, once the composition reaches a particular subterranean location, and some period of time after the composition reaches a particular subterranean location. In some embodiments, the viscosifier or combination of viscosifiers can be about 0.000,1 wt % to about 10 wt % of the composition, about 0.005 wt % to about 0.01 wt %, about 0.01 wt % to about 10 wt %, about 0.1 wt % to about 1 wt %, or about 0.000,1 wt % or less, 0.000,5 wt %, 0.001, 0.005, 0.01, 0.05, 0.1, 0.2, 0.3, 0.4, 0.5, 0.6, 0.7, 0.8, 0.9, 1, 2, 3, 4, 5, 6, 7, 8, 9, or about 10 wt % or more of the composition. The viscosifier can be a poly(($C_2$-$C_{10}$)alkene), wherein the ($C_2$-$C_{10}$)alkene is substituted or unsubstituted. The viscosifier can be a polysaccharide. The viscosifier can include at least one of guar gum, derivatized guar gum, cellulose, and derivatized cellulose. The polysaccharide viscosifier can be carboxymethyl hydroxyethyl cellulose.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly(($C_2$-$C_{10}$)alkene), wherein the ($C_2$-$C_{10}$) alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

The viscosifier can be crosslinked. In some embodiments, the method includes crosslinking the viscosifier. In some embodiments, crosslinking occurs at least one of before, during, and after the method is performed. The crosslinking can include subjecting to conductions sufficient to cause the crosslinking to occur, which can include at least one of chemical additives and heat. The crosslinking can occur at least one of above-surface and during or after placing in the subterranean formation (e.g., downhole). The crosslinker can be any suitable crosslinker. In some examples, the crosslinker can be incorporated in a crosslinked viscosifier, and in other examples, the crosslinker can crosslink a crosslinkable material (e.g., downhole, above-surface, or a combination thereof). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a ($C_1$-$C_{20}$)alkylenebiacrylamide (e.g., methylenebisacrylamide), a poly(($C_1$-$C_{20}$)alkenyl)-substituted mono- or poly-($C_1$-$C_{20}$)alkyl ether (e.g., pentaerythritol allyl ether), and a poly($C_2$-$C_{20}$)alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000,01 wt % to about 5 wt % of the composition, about 0.001 wt % to about 0.01 wt %, or about 0.000,01 wt % or less, or about 0.000,05 wt %, 0.000,1, 0.000,5, 0.001, 0.005, 0.01, 0.02, 0.03, 0.04, 0.05, 0.06, 0.07, 0.08, 0.09, 0.1, 0.15, 0.2, 0.3, 0.4, 0.5, 0.6, 0.7, 0.8, 0.9, 1, 2, 3, 4, or about 5 wt % or more.

Hydrophobically-modified Polymer Comprising at Least One Nitrogen-containing Repeating Unit.

The composition includes a hydrophobically-modified polymer including at least one nitrogen-containing repeating unit. In some examples, the hydrophobic modification is a substitution of a hydrophobic group onto one or more nitrogen atoms of the polymer. The polymer can be any suitable polymer including a nitrogen repeating unit, and any suitable number of nitrogen atoms in the polymer can include the hydrophobic modification. In various embodiments, about 0.01 mol % to about 100 mol % of the nitrogen atoms can have the hydrophobic modification, or about 1 mol % to about 99 mol %, 10 mol % to about 90 mol %, 20 mol % to about 80 mol %, 30 mol % to about 70 mol %, 40 mol % to about 60 mol %, 45 mol % to about 55 mol %, or about 1 mol % or less, or about 5 mol %, 10, 15, 20, 25, 30, 35, 40, 45, 50, 55, 60, 65, 70, 75, 80, 85, 90, or 95 mol % or more. Any suitable proportion of the composition can be the hydrophobically-modified polymer, such as about 0.001 wt % to about 30 wt %, about 0.001 wt % to about 10 wt %, about 0.01 wt % to about 1 wt %, or about 0.001 wt % or less, or about 0.005 wt %, 0.01, 0.05, 0.1, 0.2, 0.3, 0.4, 0.5, 0.6, 0.7, 0.8, 0.9, 1, 1.5, 2, 3, 4, 5, 6, 8, 10, 12, 14, 16, 18, 20, 25, or about 30 wt % or more.

The hydrophobically-modified polymer including at least one nitrogen-containing repeating unit can be at least one of a hydrophobically-modified polyamine, a hydrophobically-modified polyimine, and a hydrophobically-modified polyamide. The hydrophobically-modified polymer including at least one nitrogen-containing repeating unit can be at least one of a ($C_5$-$C_{50}$)hydrocarbyl-modified poly(($C_2$-$C_{10}$)hydrocarbylamine) and a ($C_5$-$C_{50}$)hydrocarbyl-modified poly(($C_2$-$C_{10}$)hydrocarbylamide), wherein the ($C_5$-$C_{50}$)hydrocarbyl and the ($C_2$-$C_{10}$)hydrocarbyl are independently substituted or unsubstituted and is interrupted by 0, 1, 2, or 3 atoms chosen from —O—, —S—, and substituted or unsubstituted —NH—. In various embodiments, the hydrophobically-modified polymer including at least one nitrogen-containing repeating unit is a hydrophobically-modified polyethyleneimine.

The hydrophobically-modified polymer including at least one nitrogen-containing repeating unit can be a hydrophobically-modified polyacrylic acid di($C_1$-$C_{10}$)hydrocarbylamino($C_1$-$C_{10}$)hydrocarbyl ester or a hydrophobically modified polymethacrylic di($C_1$-$C_{10}$)hydrocarbylamino($C_1$-$C_{10}$)hydrocarbyl ester, wherein the hydrophobic modification includes replacement of at least one ester group with a ($C_5$-$C_{50}$)hydrocarbyl group, wherein each ($C_1$-$C_{10}$)hydrocarbyl and each ($C_5$-$C_{50}$)hydrocarbyl is independently substituted or unsubstituted and is interrupted by 0, 1, 2, or 3 atoms chosen from —O—, —S—, and substituted or unsubstituted —NH—. The hydrophobically-modified polymer including at least one nitrogen-containing repeating unit can be a polydimethylaminoethylmethacrylate including hexadecyl-hydrophobic modifications.

The hydrophobically-modified polymer including at least one nitrogen-containing repeating unit can be a polydiallylamine that is hydrophobically-modified at one or more amine groups with a ($C_5$-$C_{50}$)hydrocarbyl that is independently substituted or unsubstituted and is interrupted by 0, 1, 2, or 3 atoms or groups chosen from —O—, —S—, furan, and substituted or unsubstituted —NH—.

The hydrophobically-modified polymer including at least one nitrogen-containing repeating unit can be a poly(alkylamine) having the following structure:

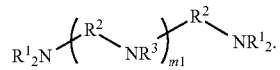

At each occurrence, $R^1$ can be selected from the group consisting of —H and a substituted or unsubstituted ($C_5$-$C_{50}$)hydrocarbyl. At each occurrence, $R^2$ can be a substituted or unsubstituted ($C_2$-$C_{10}$)hydrocarbylene. At each occurrence, $R^3$ can be selected from the group consisting of —H, a substituted or unsubstituted ($C_5$-$C_{50}$)hydrocarbyl, and a substituted or unsubstituted ($C_5$-$C_{50}$)hydrocarbylene terminated with —$NR^3_2$, wherein the ($C_5$-$C_{50}$)hydrocarbyl is independently interrupted by 0, 1, 2, or 3 groups or atoms chosen from —O—, —S—, furan, and substituted or unsubstituted —NH—. The variable m1 can be about 0 to about 100,000, or about 10 to about 25, or about 1, 2, 4, 6, 8, 10, 11, 12, 13, 14, 15, 16, 17, 18, 19, 20, 21, 22, 23, 24, 25, 26, 28, 30, 35, 40, 45, 50, 60, 70, 80, 90, 100, 125, 150, 175, 200, 225, 250, 500, 750, 1,000, 1,250, 1,500, 1,750, 2,000, 2,500, 5,000, 7,500, 10,000, 15,000, 20,000, 25,000, 50,000, or about 100,000 or more.

The variable $R^1$ can be selected from the group consisting of —H and a substituted or unsubstituted $(C_1-C_{30})$alkoxyfuryl-C(O)O—. The variable $R^1$ can be selected from the group consisting of —H and a $(C_{14})$alkoxyfuryl-C(O)O—, wherein the furan is bonded via the 2- and 5-positions.

The variable $R^2$ can be $(C_2-C_{10})$alkylene. At each occurrence, the variable $R^2$ can be $(C_2-C_5)$alkylene. At each occurrence, the variable $R^2$ can be ethylene. In various embodiments, the poly(alkylamine) can be polyethyleneimine.

At each occurrence, the variable $R^3$ can be selected from the group consisting of —H, a substituted or unsubstituted $(C_5-C_{50})$alkyl, and a substituted or unsubstituted $(C_2-C_{10})$alkylene terminated with —$NR^3{}_2$, wherein the $(C_5-C_{50})$alkyl is interrupted by 0, 1, 2, or 3 groups or atoms chosen from —O—, —S—, 2,5-bonded furan, and substituted or unsubstituted —NH—. At each occurrence, $R^3$ can be selected from the group consisting of —H, a $(C_1-C_{30})$alkoxyfuryl-C(O)O—, and a $(C_2-C_{10})$alkylene terminated with —$NR^3{}_2$. At each occurrence, $R^3$ can be selected from the group consisting of —H, a $(C_{14})$alkoxyfuryl-C(O)O—, and —$(CH_2)_2$—$NR^3{}_2$, wherein the furan is bonded via the 2- and 5-positions.

Other Components.

The composition including the viscosifier and the hydrophobically-modified polymer, or a mixture including the composition, can include any suitable additional component in any suitable proportion, such that the composition, or mixture including the same, can be used as described herein.

In some embodiments, the composition can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes a $Na^+$, $K^+$, $Li^+$, $Zn^+$, $NH_4{}^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4{}^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphate, permanganate, chlorite, or hyporchlorite ion. In some examples, the breaker can be sodium persulfate. An enzymatic breaker can be at least one of an alpha or beta amylase, amyloglucosidase, oligoglucosidase, invertase, maltase, cellulase, hemi-cellulase, and mannanohydrolase. The breaker can be about 0.001 wt % to about 30 wt % of the composition or a mixture including the same, about 0.01 wt % to about 10 wt %, about 0.01 wt % to about 5 wt %, about 0.1 wt % to about 1 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The composition, or a mixture including the composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The composition including the viscosifier and the hydrophobically-modified polymer or a mixture including the same can include any suitable downhole fluid. The composition including the viscosifier and the hydrophobically-modified polymer can be combined with any suitable downhole fluid before, during, or after the placement of the composition in the subterranean formation or the contacting of the composition and the subterranean material. In some examples, the composition including the viscosifier and the hydrophobically-modified polymer is combined with a downhole fluid above the surface, and then the combined composition is placed in a subterranean formation or contacted with a subterranean material. In another example, the composition including the viscosifier and the hydrophobically-modified polymer is injected into a subterranean formation to combine with a downhole fluid, and the combined composition is contacted with a subterranean material or is considered to be placed in the subterranean formation. The placement of the composition in the subterranean formation can include contacting the subterranean material and the mixture. Any suitable weight percent of the composition or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture including the same.

In some embodiments, the composition, or a mixture including the same, can include any suitable amount of any suitable material used in a downhole fluid. For example, the composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, fly ash, metakaolin, shale, zeolite, a crystalline silica compound, amorphous silica, hydratable clays, microspheres, lime, or a combination thereof. In various embodiments, the composition or a mixture including the same can include one or more additive components such as: COLDTROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQUITONE™ polymeric filtration agent and viscosifier; FACTANT™ emulsion stabilizer; LE SUPERMUL™, EZ MUL® NT, and FORTI-MUL® emulsifiers; DRIL TREAT® oil wetting agent for heavy fluids; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the composition or a mixture including the same can include one or more additive components such as: X-TEND® II, PAC™-R, PAC™-L, LIQUI-VIS® EP, BRINEDRIL-VIS™, BARAZAN®, N-VIS®, and AQUA-GEL® viscosifiers; THERMA-CHEK®, N-DRIL™, N-DRIL™ HT PLUS, IMPERMEX®, FILTERCHEK™, DEXTRID®, CARBONOX®, and BARANEX® filtration control agents; PERFORMATROL®, GEM™, EZ-MUD®, CLAY GRABBER®, CLAYSEAL®, CRYSTAL-DRIL®, and CLAY SYNC™ II shale stabilizers; NXS-LUBE™, EP MUDLUBE®, and DRIL-N-SLIDE™ lubricants; QUIK-THIN®, IRON-THIN™, and ENVIRO-THIN™ thinners; SOURSCAV™ scavenger; BARACOR® corrosion inhibitor; and WALL-NUT®, SWEEP-WATE®, STOPPIT™, PLUG-GIT®, BARACARB®, DUO-SQUEEZE®, BAROFIBRE™, STEELSEAL®, and HYDRO-PLUG® lost circulation management materials. Any suitable proportion of the composition or mixture including the composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture.

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone.

In various embodiments, the composition or mixture can include a proppant, a resin-coated proppant, an encapsulated resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition or mixture can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

System or Apparatus.

In various embodiments, the present invention provides a system. The system can be any suitable system that can use or that can be generated by use of an embodiment of the composition described herein in a subterranean formation, or that can perform or be generated by performance of a method for using the composition described herein. The system can include a composition including a viscosifier and a hydrophobically-modified polymer including at least one nitrogen-containing repeating unit. The system can also include a subterranean formation including the composition therein. In some embodiments, the composition in the system can also include a downhole fluid, or the system can include a mixture of the composition and downhole fluid. In some embodiments, the system can include a tubular, and a pump configured to pump the composition into the subterranean formation through the tubular.

Various embodiments provide systems and apparatus configured for delivering the composition described herein to a subterranean location and for using the composition therein, such as for a fracturing operation (e.g., pre-pad, pad, slurry, or finishing stages). In various embodiments, the system or apparatus can include a pump fluidly coupled to a tubular (e.g., any suitable type of oilfield pipe, such as pipeline, drill pipe, production tubing, and the like), with the tubular containing a composition including the viscosifier and hydrophobically-modified polymer described herein.

In some embodiments, the system can include a drill string disposed in a wellbore, with the drill string including a drill bit at a downhole end of the drill string. The system can also include an annulus between the drill string and the wellbore. The system can also include a pump configured to circulate the composition through the drill string, through the drill bit, and back above-surface through the annulus. In some embodiments, the system can include a fluid processing unit configured to process the composition exiting the annulus to generate a cleaned drilling fluid for recirculation through the wellbore.

In various embodiments, the present invention provides an apparatus. The apparatus can be any suitable apparatus that can use the composition including the viscosifier and hydrophobically-modified polymer, or that can perform an embodiment of the method for using the composition described herein.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery to the subterranean formation.

Figure 2:
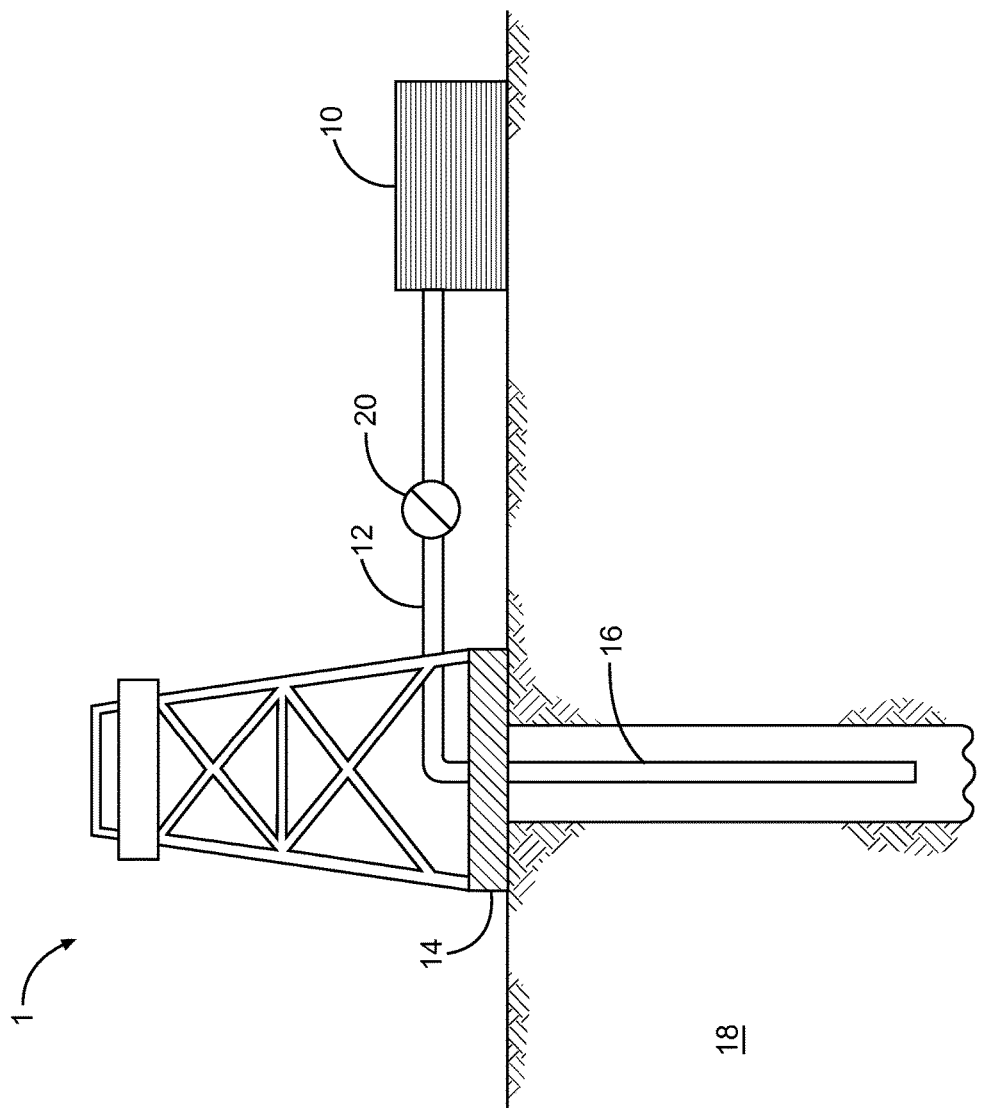
FIG. 2 illustrates a system or apparatus for delivering a composition to a subterranean formation, in accordance with various embodiments.

FIG. 2 shows an illustrative schematic of systems and apparatuses that can deliver embodiments of the compositions of the present invention to a subterranean location, according to one or more embodiments. It should be noted that while FIG. 2 generally depicts a land-based system or apparatus, it is to be recognized that like systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 2 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the composition can, in some embodiments, flow back to wellhead 14 and exit subterranean formation 18. The composition that flows back can be substantially diminished in the concentration of one or both of the viscosifier and hydrophobically-modified polymer therein. In some embodiments, the composition that has flowed back to wellhead 14 can subsequently be recovered, and in some examples reformulated, and recirculated to subterranean formation 18.

It is also to be recognized that the disclosed composition can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 2.

Composition for Treatment of a Subterranean Formation.

Various embodiments provide a composition for treatment of a subterranean formation. The composition can be any suitable composition that can be used to perform an embodiment of the method for treatment of a subterranean formation described herein.

For example, the composition can include a viscosifier and a hydrophobically-modified polymer including at least one nitrogen-containing repeating unit. In some embodiments, the composition can include a viscosifier including at least one of cellulose, a cellulose derivative, guar gum, and a guar gum derivative, and a hydrophobically-modified polyethyleneimine, wherein about 20 mol % to about 80 mol % of nitrogen atoms in the polyethyleneimine include the hydrophobic modification, wherein the hydrophobic modification is $(C_1$-$C_{30})$alkoxyfuryl-C(O)O—, wherein the furan is bonded via the 2- and 5-positions. In some embodiments, the composition can include a carboxymethyl hydroxyethyl cellulose viscosifier and a 5-(tetradecyloxy)-2-furoic acid-modified polyethyleneimine, wherein about 20 mol % to about 80 mol % of nitrogen atoms in the polyethyleneimine include the 5-(tetradecyloxy)-2-furoic acid-modification.

In some embodiments, the composition further includes a downhole fluid, such as any suitable downhole fluid. In some embodiments, the composition is a hydraulic fracturing fluid, or is mixed with a hydraulic fracturing fluid.

Method for Preparing a Composition for Treatment of a Subterranean Formation.

In various embodiments, the present invention provides a method for preparing a composition for treatment of a subterranean formation. The method can be any suitable method that produces a composition described herein. For example, the method can include forming a composition including viscosifier and a hydrophobically-modified polymer including at least one nitrogen-containing repeating unit.

EXAMPLES

Various embodiments of the present invention can be better understood by reference to the following Examples which are offered by way of illustration. The present invention is not limited to the Examples given herein. Viscosities are measured at a shear rate of 40 s$^{-1}$.

Example 1

A control hydraulic fracturing fluid formulation was preparing, having a composition of 30 pounds per thousand gallons (lb/Mgal) carboxymethyl hydroxyethyl cellulose (CMHEC), 3% KCl, 5 gpt sodium persulfate breaker, 0.75 gpt of an aluminum lactate crosslinker, in Gulf of Mexico (GoM) seawater.

A second sample was prepared by mixing 1 gpt of a hydrophobically-modified polyethyleneimine (a polyethyleneimine that is hydrophobically modified with 5-(tetradecyloxy)-2-furoic acid (TOFA) such that 50 mol % of the nitrogen atoms have a TOFA substituent thereon, wherein the molecular weight of the polyethyleneimine prior to hydrophilic modification is 800 g/mol) to a hydraulic fracturing fluid formulation having an identical composition to the control sample. The polyethylene imine additive was added prior to crosslinking.

Figure 3:
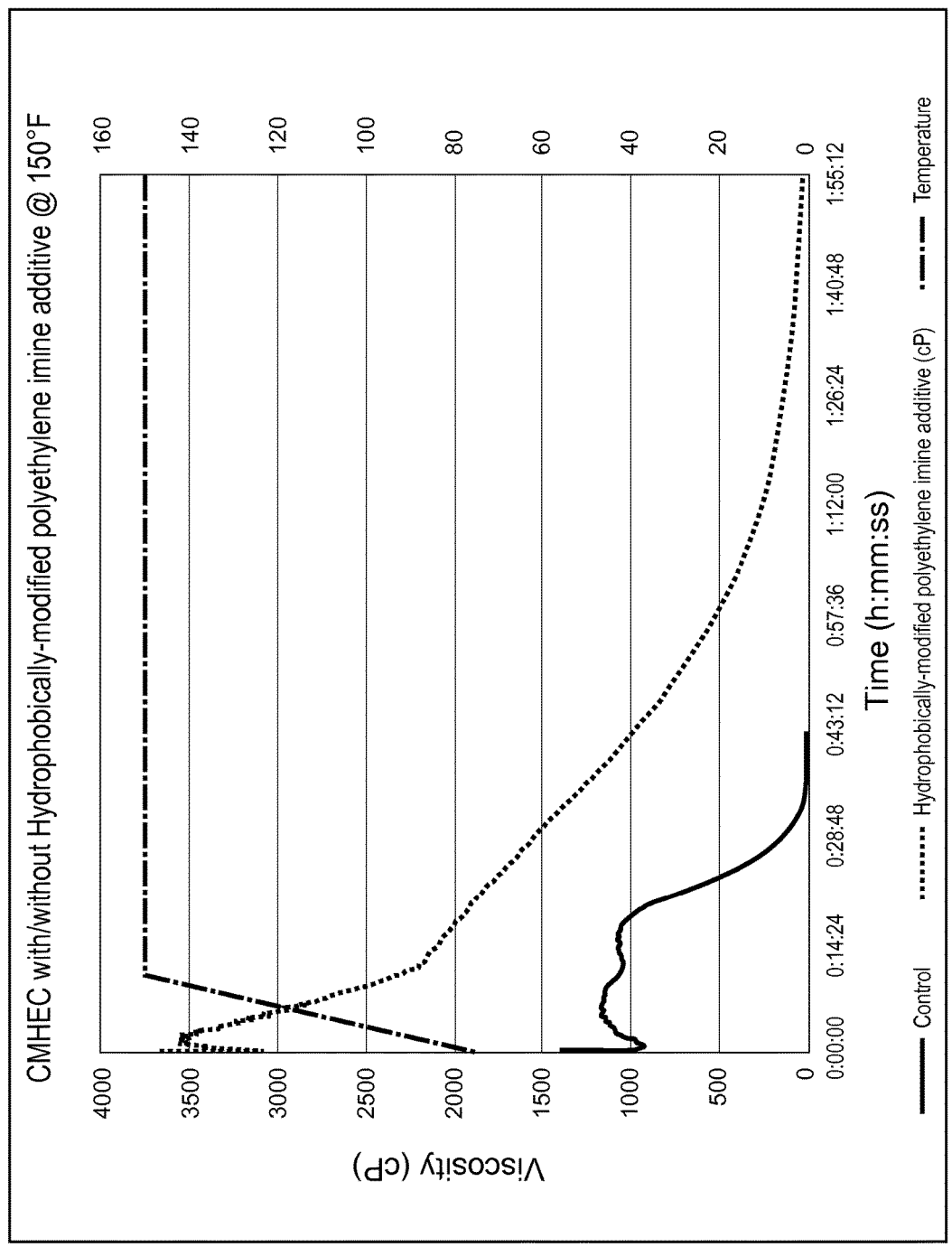
FIG. 3 illustrates viscosity versus time at various temperature of samples with and without hydrophobically-modified polyethylene imine additive, in accordance with various embodiments.

The viscosity of the control sample and the second sample were tested over time with temperatures increasing to 150° F., as illustrated in FIG. 3. The hydrophobically-modified polyethylene imine additive resulted in a marked increase in initial viscosity, as illustrated in FIG. 3. The sample with the polyethylene imine additive was shown to break completely; however, because of the increase in initial viscosity, the break time (e.g., time for the viscosity to drop below 500 cP) of the formulation was extended by a period of about 30 minutes.

Figure 4:
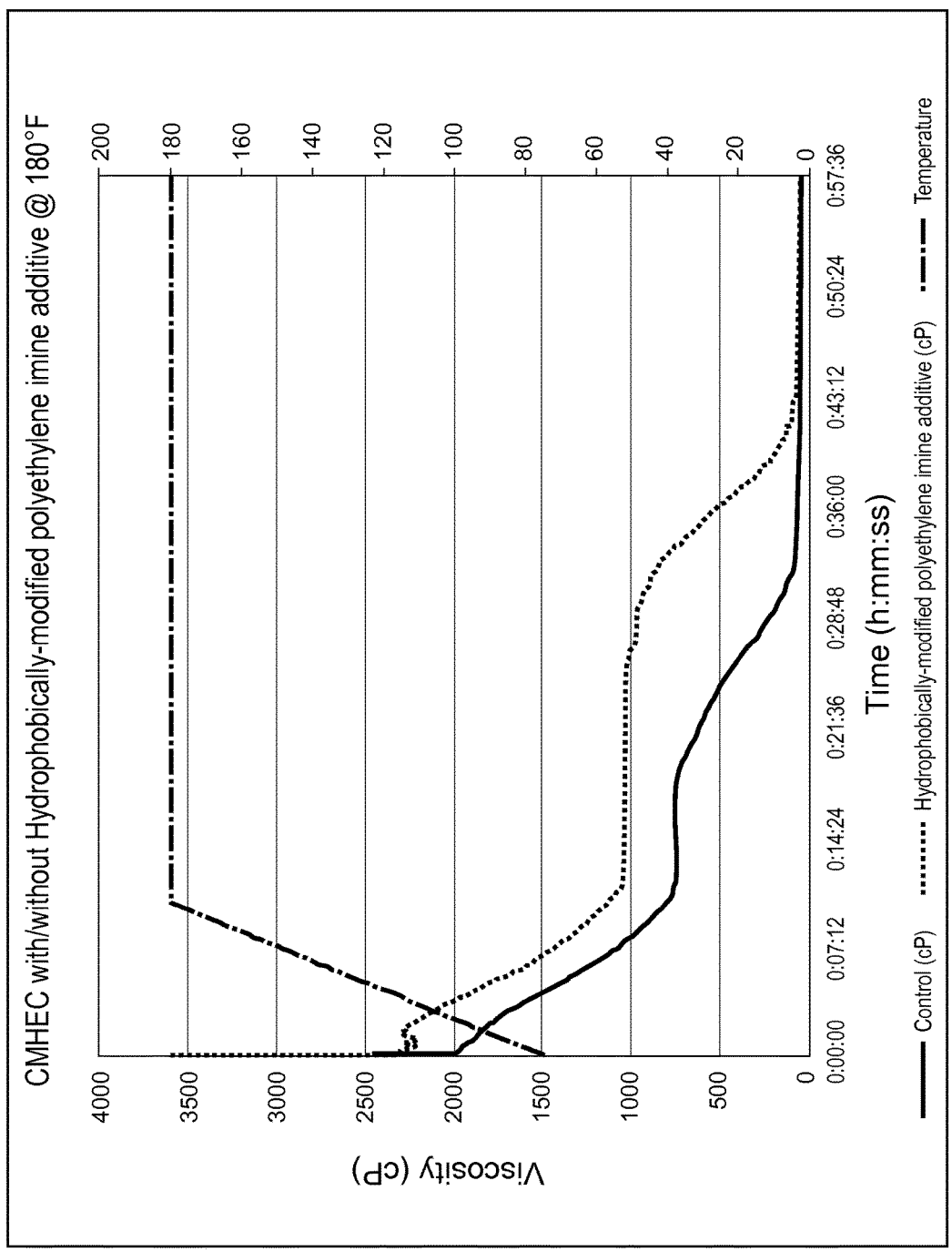
FIG. 4 illustrates viscosity versus time at various temperature of samples with and without hydrophobically-modified polyethylene imine additive, in accordance with various embodiments.

The control sample and second sample were re-prepared, and the viscosity of the control sample and the second sample were tested over time with temperatures increasing to 180° F., as illustrated in FIG. 4, showing a similar increase in initial viscosity at the higher temperature.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:
 placing in a subterranean formation a composition comprising
 a viscosifier; and
 a hydrophobically-modified polymer comprising at least one nitrogen-containing repeating unit.

Embodiment 2 provides the method of Embodiment 1, wherein the method further comprises obtaining or providing the composition, wherein the obtaining or providing of the composition occurs above-surface.

Embodiment 3 provides the method of any one of Embodiments 1-2, wherein the method further comprises obtaining or providing the composition, wherein the obtaining or providing of the composition occurs in the subterranean formation.

Embodiment 4 provides the method of any one of Embodiments 1-3, wherein the composition is a hydraulic fracturing fluid.

Embodiment 5 provides the method of any one of Embodiments 1-4, further comprising fracturing the subterranean formation with the composition.

Embodiment 6 provides the method of any one of Embodiments 1-5, further comprising surface-treating the subterranean formation with the composition.

Embodiment 7 provides the method of any one of Embodiments 1-6, further comprising breaking the composition.

Embodiment 8 provides the method of any one of Embodiments 1-7, wherein about 50 wt % to about 99.99 wt % of the composition is water.

Embodiment 9 provides the method of any one of Embodiments 1-8, wherein about 95 wt % to about 99.99 wt % of the composition is water.

Embodiment 10 provides the method of any one of Embodiments 8-9, wherein the water is at least one of fresh water, brine, produced water, flowback water, brackish water, and sea water.

Embodiment 11 provides the method of any one of Embodiments 8-10, wherein the water is salt water having a total dissolved solids level of about 1,000 mg/L to about 300,000 mg/L.

Embodiment 12 provides the method of any one of Embodiments 1-11, wherein the composition further comprises at least one of a proppant and gravel.

Embodiment 13 provides the method of any one of Embodiments 1-12, wherein about 0.01 wt % to about 10 wt % of the composition is the viscosifier.

Embodiment 14 provides the method of any one of Embodiments 1-13, wherein about 0.1 wt % to about 1 wt % of the composition is the viscosifier.

Embodiment 15 provides the method of any one of Embodiments 1-14, further comprising crosslinking the viscosifier.

Embodiment 16 provides the method of any one of Embodiments 1-15, wherein the viscosifier is crosslinked.

Embodiment 17 provides the method of any one of Embodiments 1-16, wherein the composition further includes a crosslinker.

Embodiment 18 provides the method of any one of Embodiments 1-17, wherein the viscosifier is a poly((C$_2$-C$_{10}$)alkene), wherein the (C$_2$-C$_{10}$)alkene is substituted or unsubstituted.

Embodiment 19 provides the method of any one of Embodiments 1-18, wherein the viscosifier is a polysaccharide viscosifier.

Embodiment 20 provides the method of any one of Embodiments 1-19, wherein the polysaccharide viscosifier comprises at least one of alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum, gum ghatti, gum arabic, locust bean gum, cellulose, and derivatized cellulose.

Embodiment 21 provides the method of any one of Embodiments 1-20, wherein the polysaccharide viscosifier comprises at least one of guar gum, derivatized guar gum, cellulose, and derivatized cellulose.

Embodiment 22 provides the method of any one of Embodiments 1-21, wherein the polysaccharide viscosifier is carboxymethyl hydroxyethyl cellulose.

Embodiment 23 provides the method of any one of Embodiments 1-22, wherein about 0.001 wt % to about 10 wt % of the composition is the hydrophobically-modified polymer comprising at least one nitrogen-containing repeating unit.

Embodiment 24 provides the method of any one of Embodiments 1-23, wherein about 0.01 wt % to about 1 wt % of the composition is the hydrophobically-modified polymer comprising at least one nitrogen-containing repeating unit.

Embodiment 25 provides the method of any one of Embodiments 1-24, wherein the hydrophobically-modified polymer comprising at least one nitrogen-containing repeating unit is at least one of a hydrophobically-modified polyamine, a hydrophobically-modified polyimine, and a hydrophobically-modified polyamide.

Embodiment 26 provides the method of any one of Embodiments 1-25, wherein the hydrophobically-modified polymer comprising at least one nitrogen-containing repeating unit is at least one of a (C$_5$-C$_{50}$)hydrocarbyl-modified poly((C$_2$-C$_{10}$)hydrocarbylamine) and a (C$_5$-C$_{50}$)hydrocarbyl-modified poly((C$_2$-C$_{10}$)hydrocarbylamide), wherein the (C$_5$-C$_{50}$)hydrocarbyl and the (C$_2$-C$_{10}$)hydrocarbyl are independently substituted or unsubstituted and is interrupted by 0, 1, 2, or 3 atoms chosen from —O—, —S—, and substituted or unsubstituted —NH—.

Embodiment 27 provides the method of any one of Embodiments 1-26, wherein the hydrophobically-modified polymer comprising at least one nitrogen-containing repeating unit is a hydrophobically-modified polyacrylic acid di(C$_1$-C$_{10}$)hydrocarbylamino(C$_1$-C$_{10}$)hydrocarbyl ester or a hydrophobically modified polymethacrylic di(C$_1$-C$_{10}$)hydrocarbylamino(C$_1$-C$_{10}$)hydrocarbyl ester, wherein the hydrophobic modification comprises replacement of at least one ester group with a (C$_5$-C$_{50}$)hydrocarbyl group, wherein each (C$_1$-C$_{10}$)hydrocarbyl and each (C$_5$-C$_{50}$)hydrocarbyl is independently substituted or unsubstituted and is interrupted by 0, 1, 2, or 3 atoms chosen from —O—, —S—, and substituted or unsubstituted —NH—.

Embodiment 28 provides the method of any one of Embodiments 1-27, wherein the hydrophobically-modified polymer comprising at least one nitrogen-containing repeating unit is a polydimethylaminoethylmethacrylate comprising hexadecyl-hydrophobic modifications.

Embodiment 29 provides the method of any one of Embodiments 1-28, wherein the hydrophobically-modified polymer comprising at least one nitrogen-containing repeating unit is a polydiallylamine that is hydrophobically-modified at one or more amine groups with a (C$_5$-C$_{50}$)hydrocarbyl that is independently substituted or unsubstituted and is interrupted by 0, 1, 2, or 3 atoms or groups chosen from —O—, —S—, furan, and substituted or unsubstituted —NH—.

Embodiment 30 provides the method of any one of Embodiments 1-29, wherein the hydrophobically-modified polymer comprising at least one nitrogen-containing repeating unit is a hydrophobically-modified polyethyleneimine.

Embodiment 31 provides the method of any one of Embodiments 1-30, wherein the hydrophobically-modified polymer comprising at least one nitrogen-containing repeating unit is a poly(alkylamine) having the following structure:

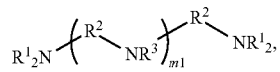

wherein at each occurrence, $R^1$ is selected from the group consisting of —H and a substituted or unsubstituted (C$_5$-C$_{50}$)hydrocarbyl, at each occurrence, $R^2$ is a substituted or unsubstituted (C$_2$-C$_{10}$)hydrocarbylene, at each occurrence, $R^3$ is selected from the group consisting of —H, a substituted or unsubstituted (C$_5$-C$_{50}$)hydrocarbyl, and a substituted or unsubstituted (C$_5$-C$_{50}$)hydrocarbylene terminated with —NR$^3{}_2$, wherein the (C$_5$-C$_{50}$)hydrocarbyl is independently interrupted by 0, 1, 2, or 3 groups or atoms chosen from —O—, —S—, furan, and substituted or unsubstituted —NH—, and m1 is about 0 to about 100,000.

Embodiment 32 provides the method of Embodiment 31, wherein at each occurrence, $R^1$ is selected from the group consisting of —H and a substituted or unsubstituted (C$_1$-C$_{30}$)alkoxyfuryl-C(O)O—.

Embodiment 33 provides the method of any one of Embodiments 31-32, wherein at each occurrence, $R^1$ is selected from the group consisting of —H and a (C$_{14}$)alkoxyfuryl-C(O)O—, wherein the furan is bonded via the 2- and 5-positions.

Embodiment 34 provides the method of any one of Embodiments 31-33, wherein at each occurrence, $R^2$ is (C$_2$-C$_{10}$)alkylene.

Embodiment 35 provides the method of any one of Embodiments 31-34, wherein at each occurrence, $R^2$ is (C$_2$-C$_5$)alkylene.

Embodiment 36 provides the method of any one of Embodiments 31-35, wherein at each occurrence, $R^2$ is ethylene.

Embodiment 37 provides the method of any one of Embodiments 31-36, wherein at each occurrence, $R^3$ is selected from the group consisting of —H, a substituted or unsubstituted (C$_5$-C$_{50}$)alkyl, and a substituted or unsubstituted (C$_2$-C$_{10}$)alkylene terminated with —NR$^3{}_2$, wherein the ($C_5$-$C_{50}$)alkyl is interrupted by 0, 1, 2, or 3 groups or atoms chosen from —O—, —S—, 2,5-bonded furan, and substituted or unsubstituted —NH—.

Embodiment 38 provides the method of any one of Embodiments 31-37, wherein at each occurrence, $R^3$ is selected from the group consisting of —H, a ($C_1$-$C_{30}$) alkoxyfuryl-C(O)O—, and a ($C_2$-$C_{10}$)alkylene terminated with —$NR^3_2$.

Embodiment 39 provides the method of any one of Embodiments 31-38, wherein at each occurrence, $R^3$ is selected from the group consisting of —H, a ($C_{14}$)alkoxyfuryl-C(O)O—, and —$(CH_2)_2$—$NR^3_2$, wherein the furan is bonded via the 2- and 5-positions.

Embodiment 40 provides the method of any one of Embodiments 31-39, wherein m1 is about 10 to about 25.

Embodiment 41 provides the method of any one of Embodiments 31-40, wherein the poly(alkylamine) is polyethyleneimine.

Embodiment 42 provides the method of any one of Embodiments 1-41, wherein the composition further includes a breaker.

Embodiment 43 provides the method of Embodiment 42, wherein about 0.01 wt % to about 10 wt % of the composition is the breaker.

Embodiment 44 provides the method of any one of Embodiments 42-43, wherein about 0.1 wt % to about 1 wt % of the composition is the breaker.

Embodiment 45 provides the method of any one of Embodiments 1-44, further comprising combining the composition with an aqueous or oil-based fluid comprising a stimulation fluid, fracturing fluid, spotting fluid, clean-up fluid, completion fluid, remedial treatment fluid, abandonment fluid, pill, acidizing fluid, packer fluid, logging fluid, or a combination thereof, to form a mixture, wherein the placing the composition in the subterranean formation comprises placing the mixture in the subterranean formation.

Embodiment 46 provides the method of any one of Embodiments 1-45, wherein at least one of prior to, during, and after the placing of the composition in the subterranean formation, the composition is used in the subterranean formation, at least one of alone and in combination with other materials, as a stimulation fluid, fracturing fluid, spotting fluid, clean-up fluid, completion fluid, remedial treatment fluid, abandonment fluid, pill, acidizing fluid, packer fluid, logging fluid, or a combination thereof.

Embodiment 47 provides the method of any one of Embodiments 1-46, wherein the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, fly ash, metakaolin, shale, zeolite, a crystalline silica compound, amorphous silica, fibers, a hydratable clay, microspheres, pozzolan lime, or a combination thereof.

Embodiment 48 provides the method of any one of Embodiments 1-47, wherein the placing of the composition in the subterranean formation comprises pumping the composition through a tubular disposed in a wellbore and into the subterranean formation.

Embodiment 49 provides a system for performing the method of any one of Embodiments 1-48, the system comprising:
  a tubular disposed in the subterranean formation; and
  a pump configured to pump the composition in the subterranean formation through the tubular.

Embodiment 50 provides a method of treating a subterranean formation, the method comprising:
  placing in a subterranean formation a composition comprising
    a viscosifier comprising at least one of cellulose, cellulose derivative, guar gum, and guar gum derivative; and
    a hydrophobically-modified polyethyleneimine, wherein about 20 mol % to about 80 mol % of nitrogen atoms in the polyethyleneimine comprise the hydrophobic modification, wherein the hydrophobic modification is ($C_1$-$C_{30}$)alkoxyfuryl-C(O)O—, wherein the furan is bonded via the 2- and 5-positions.

Embodiment 51 provides a method of treating a subterranean formation, the method comprising:
  placing in a subterranean formation a composition comprising
    a carboxymethyl hydroxyethyl cellulose viscosifier; and
    a 5-(tetradecyloxy)-2-furoic acid-modified polyethyleneimine, wherein about 20 mol % to about 80 mol % of nitrogen atoms in the polyethyleneimine comprise the 5-(tetradecyloxy)-2-furoic acid-modification.

Embodiment 52 provides a system comprising:
  a composition comprising
    a viscosifier; and
    a hydrophobically-modified polymer comprising at least one nitrogen-containing repeating unit; and
  a subterranean formation comprising the composition therein.

Embodiment 53 provides the system of Embodiment 52, further comprising
  a tubular disposed in the subterranean formation; and
  a pump configured to pump the composition in the subterranean formation through the tubular.

Embodiment 54 provides a composition for treatment of a subterranean formation, the composition comprising:
  a viscosifier; and
  a hydrophobically-modified polymer comprising at least one nitrogen-containing repeating unit.

Embodiment 55 provides the composition of Embodiment 54, wherein the composition further comprises a downhole fluid.

Embodiment 56 provides the composition of any one of Embodiments 54-55, wherein the composition is a composition for fracturing of a subterranean formation.

Embodiment 57 provides a composition for treatment of a subterranean formation, the composition comprising:
  a viscosifier comprising at least one of cellulose, a cellulose derivative, guar gum, and a guar gum derivative; and
  a hydrophobically-modified polyethyleneimine, wherein about 20 mol % to about 80 mol % of nitrogen atoms in the polyethyleneimine comprise the hydrophobic modification, wherein the hydrophobic modification is $(C_1-C_{30})$alkoxyfuryl-C(O)O—, wherein the furan is bonded via the 2- and 5-positions.

Embodiment 58 provides a composition for treatment of a subterranean formation, the composition comprising:
 a carboxymethyl hydroxyethyl cellulose viscosifier; and
 a 5-(tetradecyloxy)-2-furoic acid-modified polyethyleneimine, wherein about 20 mol % to about 80 mol % of nitrogen atoms in the polyethyleneimine comprise the 5-(tetradecyloxy)-2-furoic acid-modification.

Embodiment 59 provides a method of preparing a composition for treatment of a subterranean formation, the method comprising:
 forming a composition comprising
  a viscosifier; and
  a hydrophobically-modified polymer comprising at least one nitrogen-containing repeating unit.

Embodiment 60 provides the composition, method, or system of any one or any combination of Embodiments 1-59 optionally configured such that all elements or options recited are available to use or select from.

What is claimed is:

1. A method of treating a subterranean formation, comprising:
 placing a composition into the subterranean formation, the composition comprising:
  a viscosifier comprising at least one of cellulose, cellulose derivative, guar gum, guar gum derivative, or any combination thereof; and
  a hydrophobically-modified polyethyleneimine, wherein nitrogen atoms in the polyethyleneimine comprise the hydrophobic modification, and wherein the hydrophobic modification is $(C_1-C_{30})$alkoxyfuryl-C(O)O—.

2. The method of claim 1, further comprising fracturing the subterranean formation with the composition.

3. The method of claim 1, wherein the composition further comprises at least one of a proppant, gravel, or a combination thereof, and the method further comprises fracturing the subterranean formation with the composition.

4. The method of claim 1, wherein the viscosifier comprises about 0.1 wt % to about 1 wt % of the composition.

5. The method of claim 1, wherein the viscosifier comprises a carboxymethyl hydroxyethyl cellulose.

6. The method of claim 1, wherein the composition further comprises a breaker, and wherein the breaker comprises about 0.1 wt % to about 1 wt % of the composition.

7. The method of claim 1, wherein the furan is bonded via the 2- and 5-positions.

8. The method of claim 1, wherein the hydrophobic modification is a $(C_{14})$alkoxyfuryl-C(O)O—.

9. A system for performing the method of claim 1, the system comprising:
 a tubular disposed in the subterranean formation; and
 a pump configured to pump the composition into the subterranean formation through the tubular.

10. A method of treating a subterranean formation, comprising:
 placing a composition into the subterranean formation, the composition comprising:
  a viscosifier comprising at least one of cellulose, cellulose derivative, guar gum, guar gum derivative, or any combination thereof; and
  a hydrophobically-modified polyethyleneimine, wherein about 20 mol % to about 80 mol % of nitrogen atoms in the polyethyleneimine comprise the hydrophobic modification, wherein the hydrophobic modification is $(C_1-C_{30})$alkoxyfuryl-C(O)O—, and wherein the furan is bonded via the 2- and 5-positions.

11. The method of claim 10, further comprising fracturing the subterranean formation with the composition.

12. The method of claim 11, wherein the composition further comprises at least one of a proppant, gravel, or a combination thereof.

13. The method of claim 10, wherein the viscosifier comprises about 0.1 wt % to about 1 wt % of the composition.

14. The method of claim 10, wherein the viscosifier comprises a carboxymethyl hydroxyethyl cellulose.

15. The method of claim 10, wherein the hydrophobic modification is a $(C_{14})$alkoxyfuryl-C(O)O—.

16. The method of claim 10, wherein the composition further comprises a breaker, and wherein the breaker comprises about 0.1 wt % to about 1 wt % of the composition.

17. A composition for treatment of a subterranean formation, comprising:
 a carboxymethyl hydroxyethyl cellulose viscosifier; and
 a 5-(tetradecyloxy)-2-furoic acid-modified polyethyleneimine, wherein about 20 mol % to about 80 mol % of nitrogen atoms in the polyethyleneimine comprise the 5-(tetradecyloxy)-2-furoic acid-modification.

18. The composition of claim 17, further comprising at least one of a proppant, gravel, or a combination thereof.

19. The composition of claim 17, wherein the viscosifier comprises about 0.1 wt % to about 1 wt % of the composition.

20. The composition of claim 17, further comprising a breaker, and wherein the breaker comprises about 0.1 wt % to about 1 wt % of the composition.

* * * * *